Feb. 24, 1970 W. E. SINDELAR 3,497,255
UNIVERSAL JAW ASSEMBLY
Filed Dec. 11, 1967
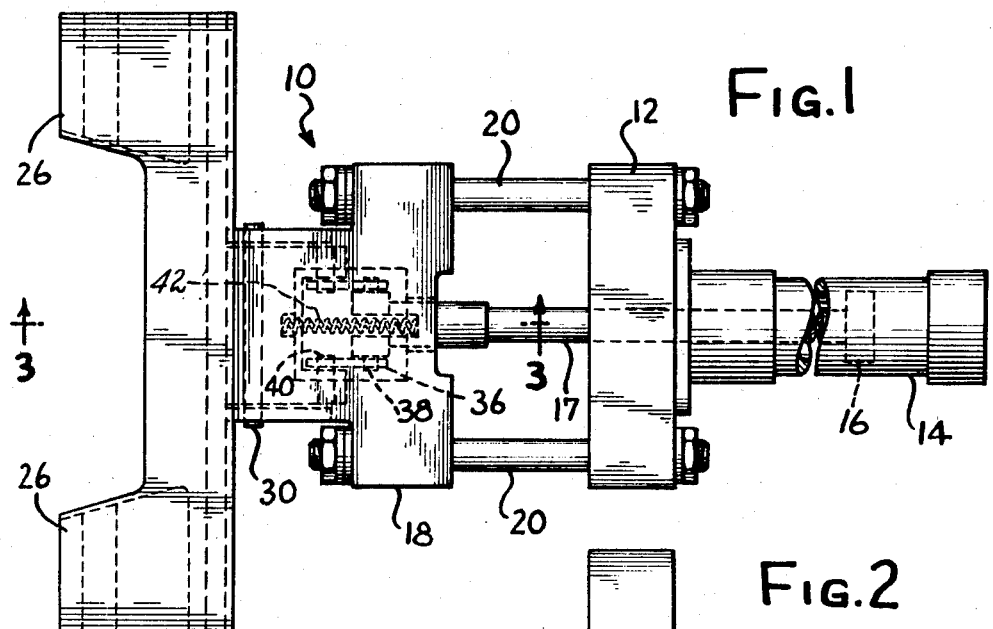
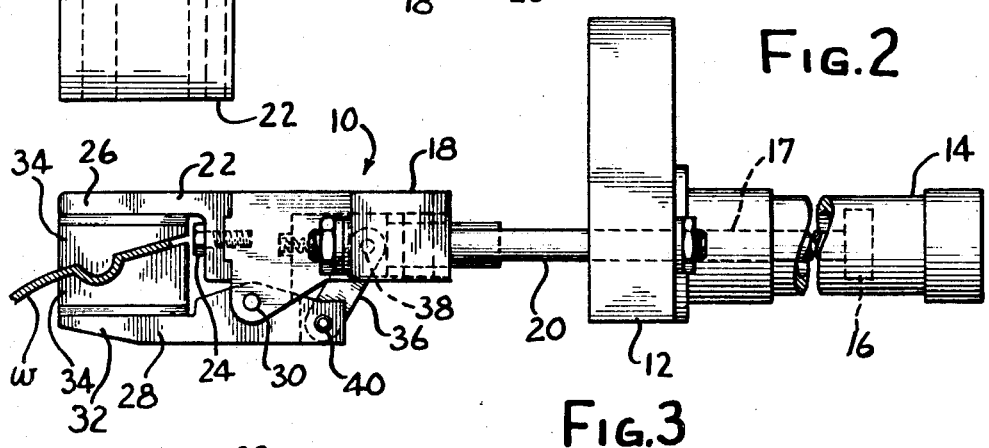
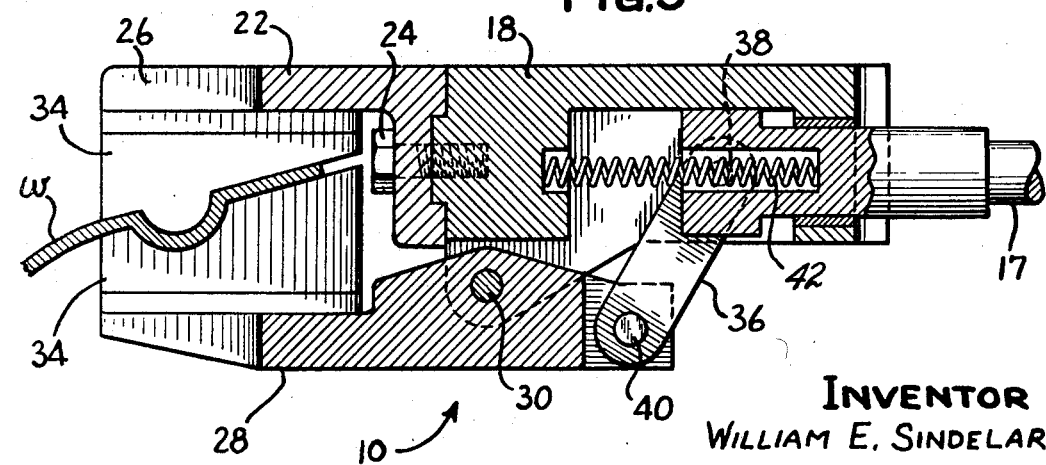
INVENTOR
WILLIAM E. SINDELAR
by: Wolfe, Hubbard, Voit & Osann
ATTYS.

3,497,255
UNIVERSAL JAW ASSEMBLY

William E. Sindelar, Westmont, Ill., assignor to Danly Machine Corporation, Chicago, Ill., a corporation of Illinois
Filed Dec. 11, 1967, Ser. No. 689,673
Int. Cl. B66c 1/10
U.S. Cl. 294—88      2 Claims

ABSTRACT OF THE DISCLOSURE

A power operated jaw assembly for gripping a workpiece including a post, a frame slidably mounted on the post, a piston terminating in a slide which is movable in the frame, link means pivotally connected to the slide, a fixed jaw insert having a gripping element detachably mounted to the frame, a movable jaw insert having a gripping element connected to the frame for rocker-like movement and pivotally connected to the link means with movement of the piston in one direction causing the distance between the jaw inserts to increase and in the other direction to decrease.

---

The present invention relates to transfer devices for power presses and the like, and more particularly to improved jaw assemblies of the type utilized in conjunction with power transfer mechanisms which move a workpiece from one position to another.

Recently, automatic transfer mechanisms have been developed that are particularly useful in a press line which is capable of automatically performing a series of operations on a workpiece. Typically, a series of power presses are provided with conveyors extending from one to the next and each press employs a first transfer mechanism for loading a workpiece from the input side of the conveyor into the press work area and a second transfer mechanism for unloading the workpiece from the work area to the conveyor at the output side for automatic transport of the workpiece down the line.

Particularly advantageous types of automatic transfer mechanisms are those in which the approach and returning movements of the transfer arm are tailored precisely to the type of gripping element of the jaw assembly being used so as to permit gripping and releasing of the workpiece without disturbing its position either on the conveyor or on the press. To utilize the maximum capability of such transfer mechanisms the jaw assemblies must be able to transfer any of a variety of diversely shaped workpieces. Typically, the jaw assemblies include integral jaw members to which are detachably mounted resinous molded portions or the like that are complementally shaped to coincide with the surfaces of the workpiece being transferred and also serve to prevent moving of the workpiece.

While these molded portions can be easily changed when a differently shaped workpiece replaces those previously transferred, the size of the jaw assembly itself may limit the ease of convertibility. For example, when a workpiece of relatively large surface area is to be transported, the jaw assembly must contact a sufficient amount of surface and in proper location on the workpiece to insure that "buckling" of the workpiece does not result. In similar fashion, a jaw assembly should be tailored to accommodate a particular range of workpiece thicknesses to prevent loss of gripping force and excess wear on the molded portion of the jaw. It is, accordingly, oftentimes necessary to change the entire jaw assembly and replace it with one more suitably shaped to accommodate the transfer of a workpiece. In addition to the downtime involved in making the change, an inventory of jaw assemblies must be maintained to insure that an assembly suitable for use in connection with a particular shaped workpiece is on hand. Maintenance of such an inventory is an expensive proposition.

A general aim of the present invention is to provide an improved jaw assembly characterized by components that can be quickly removed and changed so that an unlimited number of diversely shaped workpieces can be effectively gripped. A related and more specific object is the provision of an improved jaw assembly which includes jaw inserts that are detachably mounted to a jaw assembly frame.

It is another object of the invention to provide an improved jaw assembly that can be tailored according to the size of the workpiece being handled, yet which does not necessitate the maintenance of a relatively expensive inventory of jaw assemblies.

Still another object of the invention is to provide a jaw assembly of the above-described type which may be inexpensively and easily constructed.

Other objects and advantages of the present invention will become apparent as the following description proceeds, taken in conjunction with the accompanying drawings, in which:

FIG. 1 is a top plan view of an improved jaw assembly constructed in accordance with this invention;

FIG. 2 is a side elevation view of the jaw assembly illustrated in FIG. 1; and

FIG. 3 is a cross-sectional view taken substantially along lines 3—3 of FIG. 1 and illustrating the linkage between the movable jaw insert and the piston rod which causes the gripping action.

While the invention has been described in connection with a preferred embodiment, it is to be understood that the invention is not intended to be limited to the embodiment shown, but, on the contrary, the invention is intended to cover the various alternatives and equivalent constructions included within the spirit and scope of the appended claims.

Turning now to the drawings there is illustrated in FIG. 1 an exemplary jaw assembly generally indicated at 10, in accordance with the present invention which is suitable for use with a power press transfer mechanism and the like. For details of a transfer mechanism of the type to which the jaw assembly 10 can be applied, reference is made to James C. Danly, U.S. 3,119,443, issued Aug. 10, 1965.

The jaw assembly 10 is arranged to be mounted on a base 12 of a transfer arm (not shown) which can be suitably operated in conjunction with a power press so as to extend and retract to push up and deposit workpieces.

As here shown, the assembly, when not in use, is in the retracted position and can be extended to pick up and transfer a workpiece. Thus, there is provided a source of power such as, for example, an air ram 14 on the base 12. The air ram 14 includes a piston 16 which terminates in a slide 17. A frame 18 is slidably mounted on posts 20 and the slide 17 is adapted to be slidably positioned within the frame 18.

In accordance with this invention the workpiece is gripped by detachable jaw inserts that are mounted on the frame 18. To this end one jaw insert 22 is fixed in position and is attached to the frame 18 in any suitable manner such as, for example, by bolts 24. The insert 22 can be variable in shape depending upon the shape of the workpiece being transferred and in the present instance includes a pair of laterally spaced gripping elements 26. The space between the gripping elements 26 should generally be increased as the dimensions of the workpiece being transferred increases to insure that adequate gripping results so the workpiece is not deformed in any way.

In accordance with another aspect of this invention, there is provided a movable jaw insert 28 that cooperates with the fixed jaw insert 22 to grip the workpieces, yet which can be easily removed from the remainder of the jaw assembly when a workpiece to be transferred requires grippers of different shapes. Thus, the improved jaw assembly includes movable jaw insert 28 that is detachably mounted for rocker-like movement in any suitable manner such as, for example, by the horizontally extending pin 30. The movable jaw insert 28 includes a pair of laterally spaced gripping elements 32 that are generally identical in shape to the gripping elements 26 of the fixed jaw insert 22. It will be appreciated, however, that gripping elements may be one piece rather than spaced elements if desired, without departing from the present invention.

Each of the gripping elements 26 and 32 includes faces that may be formed of any suitable material and preferably they are provided with a resinous face 34 which is molded to conform to the external surfaces of the workpiece. Any suitable synthetic resin can generally be employed. These molded faces 34 can be attached to the gripping elements in any desired manner such as by screws (not shown) or an adhesive.

For the purpose of moving jaw insert 28 a linkage 36 is provided between the insert and the air ram. As shown in FIGURE 3, the linkage 36 is pivotally connected to silde 17 at 38 and to the movable jaw insert 28 with pin 40. Forward movement of the slide 17 is prevented by the spring 42. In its retracted position the spring 42 biases the slide 17 in a rearward direction thus maintaining the jaws in an open position. When a workpiece is to be transferred, the air ram 14 moves the frame 18 outwardly and this is followed by movement of the slide 17 so that closing torque is transmitted to the movable jaw insert 28 by the linkage 36.

Various shaped workpieces can be readily handled by providing jaw inserts having a configuration which conforms to the portion of the workpiece gripped and therefore proper gripping is assured. Rather than removing the entire assembly and replacing it, the jaw inserts 22 and 28 are easily replaced by simply dislodging the pins 30, disconnecting the pivotal connections at 40 and unscrewing the bolts 24.

Thus, it can be seen that the present invention provides an improved jaw assembly which is able to handle diversely shaped workpieces by providing readily detachable jaw inserts that can be tailored to the particular workpiece and yet there is no need to maintain an expensive inventory of jaw assemblies. Similarly, the ease with which the inserts can be replaced minimizes the downtime.

I claim as my invention:

1. In a power operated jaw assembly for gripping a workpiece which assembly includes at least one post, a frame sildably mounted on the post, a piston terminating in a slide which is movable in the frame and link means pivotally connected to the slide, the improvement which comprises a fixed jaw insert having a first gripping element, said fixed jaw insert being detachably mounted to said frame, means for mounting said fixed jaw insert and gripping element to the frame, a movable jaw insert having a second gripping element, said movable jaw insert being connected to said frame for rocker-like movement and removable means for pivotally connecting said movable jaw insert to said link means, whereby movement of the piston in one direction causes the distance between the gripping elements of the movable and fixed jaw inserts to decrease and in the other direction to increase.

2. A jaw assembly as claimed in claim 1 wherein said fixed and movable jaw inserts each have a pair of laterally spaced gripping elements.

References Cited
UNITED STATES PATENTS

| | | | |
|---|---|---|---|
| 987,163 | 8/1908 | Shaw | 294—104 |
| 3,146,015 | 8/1964 | Roberge | 294—104 X |
| 3,152,706 | 10/1964 | Conrad | 294—104 X |

EVON C. BLUNK, Primary Examiner

D. WATTS, Assistant Examiner

U.S. Cl. X.R.

294—104